United States Patent
Isshiki (10) Patent No.: US 7,365,902 B2
(45) Date of Patent: Apr. 29, 2008

(54) OPTICAL AMPLIFIER AND OPTICAL COMMUNICATION SYSTEM

(75) Inventor: Kunihiko Isshiki, Tokyo (JP)

(73) Assignee: Mitsubishi Denki K.K., Tokyo (JP)

( * ) Notice: Subject to any disclaimer, the term of this patent is extended or adjusted under 35 U.S.C. 154(b) by 134 days.

(21) Appl. No.: 10/515,054

(22) PCT Filed: Apr. 3, 2003

(86) PCT No.: PCT/JP03/04289

§ 371 (c)(1),
(2), (4) Date: Nov. 19, 2004

(87) PCT Pub. No.: WO2004/091121

PCT Pub. Date: Oct. 21, 2004

(65) Prior Publication Data

US 2005/0237600 A1 Oct. 27, 2005

(51) Int. Cl.
*H01S 3/00* (2006.01)
(52) U.S. Cl. .................. 359/334; 359/341.41
(58) Field of Classification Search .......... 359/334, 359/341.41
See application file for complete search history.

(56) References Cited

U.S. PATENT DOCUMENTS

| | | | |
|---|---|---|---|
| 6,188,508 B1* | 2/2001 | Horiuchi et al. ............. 359/334 |
| 6,292,288 B1 | 9/2001 | Akasaka et al. |
| 6,417,958 B1 | 7/2002 | Du et al. |
| 6,441,951 B1* | 8/2002 | Tanaka et al. ............... 359/334 |
| 6,452,716 B1* | 9/2002 | Park et al. ................... 359/334 |
| 6,462,861 B2* | 10/2002 | Ohshima et al. ............ 359/334 |
| 6,496,634 B1* | 12/2002 | Levenson .................... 385/125 |
| 6,510,000 B1* | 1/2003 | Onaka et al. ................ 359/334 |
| 6,532,102 B2* | 3/2003 | Kobayashi et al. ......... 359/334 |
| 6,624,926 B1* | 9/2003 | Hayashi et al. ............. 359/334 |
| 6,636,659 B2* | 10/2003 | Kagi et al. .................... 385/24 |
| 6,704,508 B1 | 3/2004 | Asahi |
| 6,798,563 B2* | 9/2004 | Mailhot et al. ............. 359/334 |
| 6,813,067 B1* | 11/2004 | Birk et al. ................... 359/334 |
| 6,859,306 B2* | 2/2005 | Fishman et al. ............ 359/334 |
| 2002/0024721 A1 | 2/2002 | Tsuzaki et al. |

(Continued)

FOREIGN PATENT DOCUMENTS

JP         10-73852 A         3/1998

(Continued)

*Primary Examiner*—Deandra M. Hughes
*Assistant Examiner*—Ari M Diacou
(74) *Attorney, Agent, or Firm*—Birch, Stewart, Kolasch & Birch, LLP (57) ABSTRACT

An optical amplifier includes a plurality of pump light sources, an intensity modulator that modulates intensity of a pump light to be output from any one of the pump light sources, at a predetermined frequency; a photoelectric converter that converts a part of the wavelength-division multiplexed signal light Raman-amplified by the pump light to electrical signals; a gain modulation signal detector that extracts a gain modulation signal having a component of the frequency from the electrical signals; and a controller that controls only the intensity of pump lights that are output from the pump light source, of which intensity is modulated at the frequency to control Raman amplification gain so that an amplitude of the gain modulation signal becomes a predetermined value. The intensities of pump lights output from individual pump light sources are sequentially controlled to obtain a predetermined value of the Raman amplification gain.

9 Claims, 6 Drawing Sheets

U.S. PATENT DOCUMENTS

| | | | |
|---|---|---|---|
| 2002/0041431 A1* | 4/2002 | Ohshima et al. | 359/334 |
| 2002/0044336 A1* | 4/2002 | Tanaka et al. | 359/334 |
| 2002/0054733 A1* | 5/2002 | Kagi et al. | 385/27 |
| 2002/0101652 A1 | 8/2002 | Hayashi et al. | |
| 2002/0167716 A1* | 11/2002 | Yamanaka | 359/334 |
| 2002/0181078 A1* | 12/2002 | Tanaka et al. | 359/334 |
| 2003/0011874 A1* | 1/2003 | Nakamoto et al. | 359/334 |
| 2003/0020995 A1 | 1/2003 | Harasawa | |
| 2003/0081307 A1* | 5/2003 | Fludger et al. | 359/334 |
| 2003/0095745 A1* | 5/2003 | Gehlot | 385/31 |
| 2003/0137720 A1* | 7/2003 | Onaka et al. | 359/334 |
| 2003/0202237 A1* | 10/2003 | Harasawa | 359/334 |
| 2003/0210913 A1* | 11/2003 | Kakui et al. | 398/195 |
| 2004/0004754 A1* | 1/2004 | Mailhot et al. | 359/334 |
| 2004/0042061 A1* | 3/2004 | Islam et al. | 359/334 |
| 2004/0201882 A1* | 10/2004 | Kikuchi | 359/341.43 |
| 2006/0050365 A1* | 3/2006 | Hainberger et al. | 359/334 |

FOREIGN PATENT DOCUMENTS

| | | |
|---|---|---|
| JP | 11-344732 A | 12/1999 |
| JP | 2000-98433 A | 4/2000 |
| JP | 2000-183820 A | 6/2000 |
| JP | 2000-358261 A | 12/2000 |
| JP | 2001-7768 A | 1/2001 |
| JP | 2002-40495 A | 2/2002 |
| JP | 2002-232048 A | 8/2002 |
| JP | 2002-290332 A | 10/2002 |
| JP | 2003-37562 A | 2/2003 |

* cited by examiner

OPTICAL AMPLIFIER AND OPTICAL COMMUNICATION SYSTEM

TECHNICAL FIELD

The present invention relates to an optical amplifier in an optical communication system, and more particularly to an optical amplifier used in an optical amplifying-repeating transmission system that transmits wavelength-division multiplexed main signal light (hereinafter, "WDM main signal light"), and to an optical communication system.

BACKGROUND ART

An optical communication system performs communications by transmitting main signal light through an optical fiber. In the optical communication system, the power of WDM main signal light transmitted from an optical transmitter decreases due to transmission loss during the time when it reaches an optical receiver through the optical fiber. If the power of the main signal light when it reaches the optical receiver is not higher than a predetermined value, the optical receiver cannot read the main signal light. This causes an error and the optical communication not successfully be carried out. One approach to avoid this problem is to provide an optical amplifier between the optical transmitter and the optical receiver and amplify the power of the main signal light with the optical amplifier to compensate for the transmission loss of the main signal light. By providing the optical amplifier, a main signal light with a predetermined power or higher can be input into the optical receiver.

Figure 1:
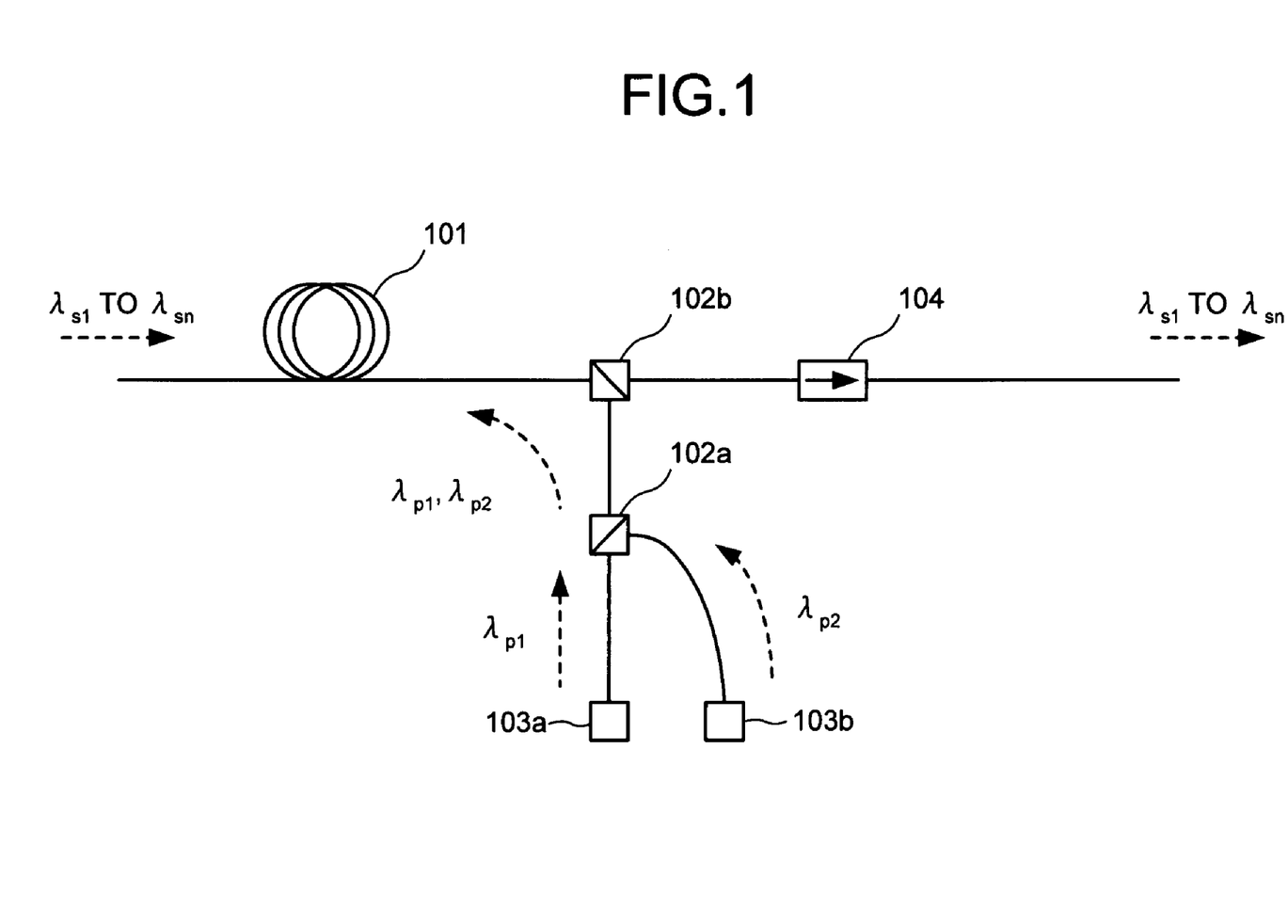
FIG. 1 is a block diagram of a schematic configuration of a conventional Raman amplifier.

As the optical amplifier, a Raman amplifier is available. The Raman amplifier supplies a pump light to an optical fiber, which is an amplifying medium through which a main signal light propagates, and amplifies the main signal light by using a nonlinear phenomenon called "stimulated Raman scattering". FIG. 1 is a block diagram of a schematic configuration of a conventional Raman amplifier (see, for example, Patent literature 1). The Raman amplifier transmits the WDM main signal light in which the n-number of main signal lights having wavelengths $\lambda_{s1}$ to $\lambda_{sn}$ [µm] ($\lambda_{s1}<\lambda_{sn}$) are wavelength-division multiplexed. The Raman amplifier includes a silica-based glass optical fiber (e.g., single-mode optical fiber (SMF)) 101 for providing Raman amplification, and two pump light sources 103a and 103b that generate pump lights having different wavelengths $\lambda_{p1}$ and $\lambda_{p2}$ [µm] ($\lambda_{p1}<\lambda_{p2}$). The Raman amplifier also includes a first photocoupler 102a that couples the pump lights generated in the pump light sources 103a and 103b, a second photocoupler 102b that guides the pump lights coupled, to the silica-based glass optical fiber 101, and an isolator 104 that prevents backflow of the WDM main signal light Raman-amplified in the silica-based glass optical fiber 101. In this example, the two pump light sources 103a and 103b are used to flatten the waveform characteristics of gain of the main signal light Raman-amplified.

The operation of the Raman amplifier is explained below. The WDM main signal light is introduced into the silica-based glass optical fiber 101 that is a transmission path and a Raman amplifying medium. On the other hand, the two pump lights having different wavelengths emitted from the two pump light sources 103a and 103b are coupled by the first photocoupler 102a, and the pump lights coupled are introduced into the silica-based glass optical fiber 101 in a reverse direction to a direction of travel of the WDM main signal light by the second photocoupler 102b. The pump light causes an optical amplifying action due to the phenomenon of stimulated Raman scattering in the silica-based glass optical fiber 101 that is an amplifying medium. The WDM main signal light is thereby Raman-amplified in the silica-based glass optical fiber 101, and is output.

Figure 2:
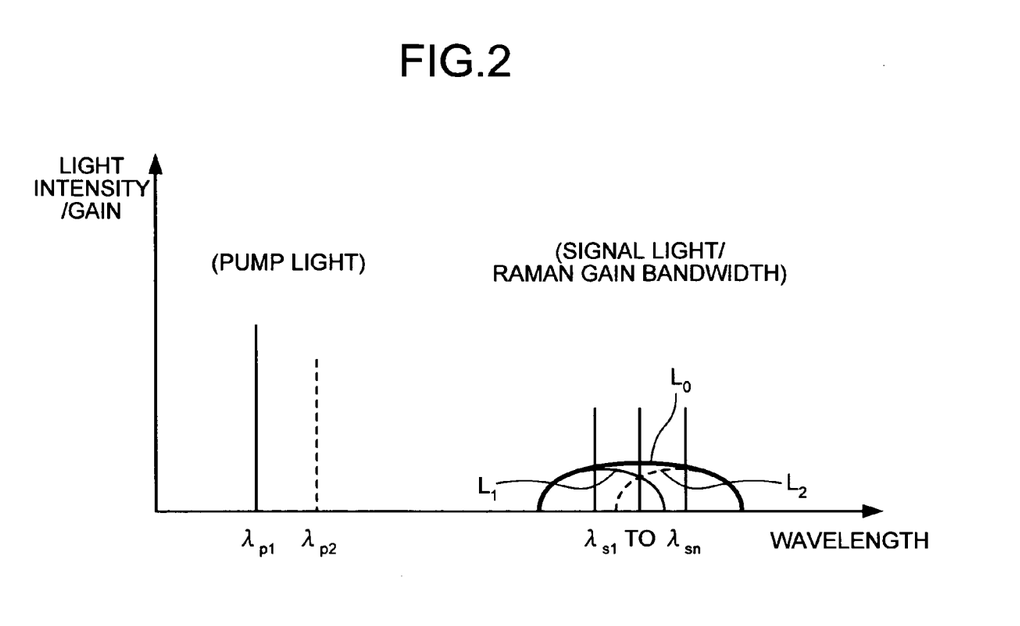
FIG. 2 is a spectrum of a pump light/signal light and a Raman gain bandwidth in a silica-based glass optical fiber of the conventional Raman amplifier.

FIG. 2 is a spectrum of the pump light/signal light and the Raman gain bandwidth in the silica-based glass optical fiber of the conventional Raman amplifier. The Raman gain bandwidths for the pump light wavelengths $\lambda_{p1}$ and $\lambda_{p2}$ [µm] in the Raman amplification are formed as a wavelength range on the longer wavelength side by about 0.1 [µm] from the respective pump light wavelengths. The wavelength range covers almost both the wavelengths of the two pump lights. For example, a Raman gain bandwidth for the pump light having the wavelength $\lambda_{p1}$ [µm] is in a range indicated by a solid line $L_1$, and a Raman gain bandwidth for the pump light having the wavelength $\lambda_{p2}$ [µm] is in a range indicated by a broken line $L_2$. The Raman gain bandwidth achieved by being pumped by the two pump lights having the wavelengths $\lambda_{p1}$ and $\lambda_{p2}$ [µm] is in a range indicated by a solid line $L_0$ in which the Raman gain bandwidths corresponding to the respective wavelengths of the pump lights are combined.

As shown in FIG. 2, the main signal light positioned on the shortest wavelength side of the WDM main signal light is pumped mainly by the pump light having the short wavelength $\lambda_{p1}$, while the main signal light positioned on the longest wavelength side of the WDM main signal light is pumped mainly by the pump light having the long wavelength $\lambda_{p2}$. Moreover, a wavelength at around the center of the WDM main signal light is pumped by the pump lights having the two wavelengths $\lambda_{p1}$ and $\lambda_{p2}$, and is thereby Raman-amplified. In other words, how the two pump lights contribute to individual main signal lights of the WDM main signal light depends on the wavelengths of the pump lights. Therefore, by adequately setting the wavelengths $\lambda_{p1}$ and $\lambda_{p2}$ of the pump lights to control the power of the pump lights from the pump light sources 103a and 103b, the Raman gain bandwidth can be made widened so as to cover the wavelengths $\lambda_{s1}$ to $\lambda_{sn}$ of the WDM main signal light. As a result, the loss of the silica-based glass optical fiber 101 can be compensated for over a broader bandwidth in a required signal transmission bandwidth.

In the optical communication system, an optical amplification transmission system, which compensates for the loss of signal light using the Raman amplifier, is set in one transmission section and a many such transmission sections are cascade-connected. This structure allows construction of a long-distance optical communication system. In the long-distance optical communication system also, the wavelength of each pump light and the power of the pump light are controlled in each transmission section to keep a Raman gain bandwidth to a broad bandwidth in each transmission section, which makes it possible to carry out long-distance transmission of WDM main signal light having a broad bandwidth.

In the optical communication system that amplifies and repeats the main signal light between an optical transmitter and an optical receiver, in order to transmit a control signal for remotely controlling an optical repeater that forms the optical communication system, a control signal with network management information thereon needs to be transmitted in an optical network thereof, different from the main signal light. There is a known structure for this. In this structure, the intensity of a digital modulation signal light is further modulated with a control signal having a comparatively low frequency to allow it to propagate through the silica-based glass optical fiber. For example, a control signal superimposing device is disclosed. The control signal superimposing device superimposes a control signal in the optical transmission system on the main signal light by using the fact that the intensity of a main signal light Raman-amplified by pump light intensity-modulated with the control signal also fluctuates according to the control signal (see, for example, Patent literature 2).

Patent Literature 1:

Japanese Patent Application Laid Open No. HEI 10-73852 (pages 2 to 3, FIG. 2 and FIG. 4)

Patent Literature 2:

Japanese Patent Application Laid Open No. HEI 11-344732 (pages 3 to 4, FIG. 1 and FIG. 2)

However, in the case of the optical amplifier disclosed in the Patent literature 1 as a conventional technology, it is mandatory to control the power of individual pump lights so that the level of the WDM main signal light Raman-amplified becomes uniform. In this case, as shown in FIG. 2, a main signal light having a wavelength is pumped by pump lights having a plurality of wavelengths, and moreover, the pumping by the pump lights is different in respective main signal lights, which makes it difficult to control such power. If there is loss of a plurality of silica-based glass optical fibers and there are fluctuations in Raman gain coefficient in particular, or if the loss of the silica-based glass optical fibers fluctuates, it is not easy to control the power of individual pump lights so that the level of the WDM main signal light Raman-amplified becomes uniform.

On the other hand, the control signal superimposing device disclosed in the Patent literature 2 has an object to keep constant the modulated intensity of a main signal light, that is, to stably keep the modulated level of a control signal component. The object is achieved by superimposing a control signal transmitted in the optical transmission system or an optical network on the main signal light, and preventing a control signal component superimposed on the main signal light from being in over-modulation. Therefore, the control signal superimposing device is not related to a technology that controls the power of individual pump lights so that the level of the main signal light Raman-amplified becomes uniform, in other words, the Raman amplification gain becomes a predetermined value.

The present invention has been achieved to solve the problems, and it is an object of the present invention to obtain an optical amplifier capable of controlling Raman gain so that the level of a WDM main signal light Raman-amplified becomes uniform, and an optical communication system using the optical amplifier.

DISCLOSURE OF THE INVENTION

An optical amplifier according to an aspect of the present invention multiplexes pump lights having different wavelengths output from a plurality of pump light sources on a wavelength-division multiplexed signal light propagating through a transmission path to provide Raman amplification. The optical amplifier includes an intensity modulator that modulates intensity of a pump light to be output from any one of the pump light sources, at a predetermined frequency; a photoelectric converter that converts a part of the wavelength-division multiplexed signal light Raman-amplified by the pump light to electrical signals; a gain modulation signal detector that extracts a gain modulation signal having a component of the frequency from the electrical signals; and a controller that controls only the intensity of pump lights that are output from the pump light source, of which intensity is modulated at the frequency to control Raman amplification gain so that an amplitude of the gain modulation signal becomes a predetermined value. The intensities of pump lights output from individual pump light sources are sequentially controlled to obtain a predetermined value of the Raman amplification gain.

BEST MODE FOR CARRYING OUT THE INVENTION

Exemplary embodiments of an optical amplifier and an optical communication system according to the present invention are explained in detail below with reference to the accompanying drawings.

FIRST EMBODIMENT

Figure 3:
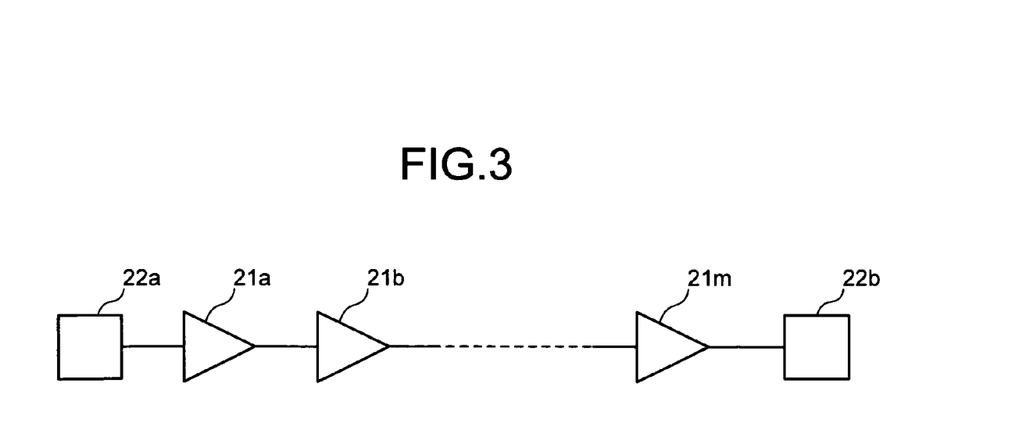
FIG. 3 is a schematic diagram of a structure of an optical communication system in which an optical amplifier according to the present invention is used.
Figure 4:
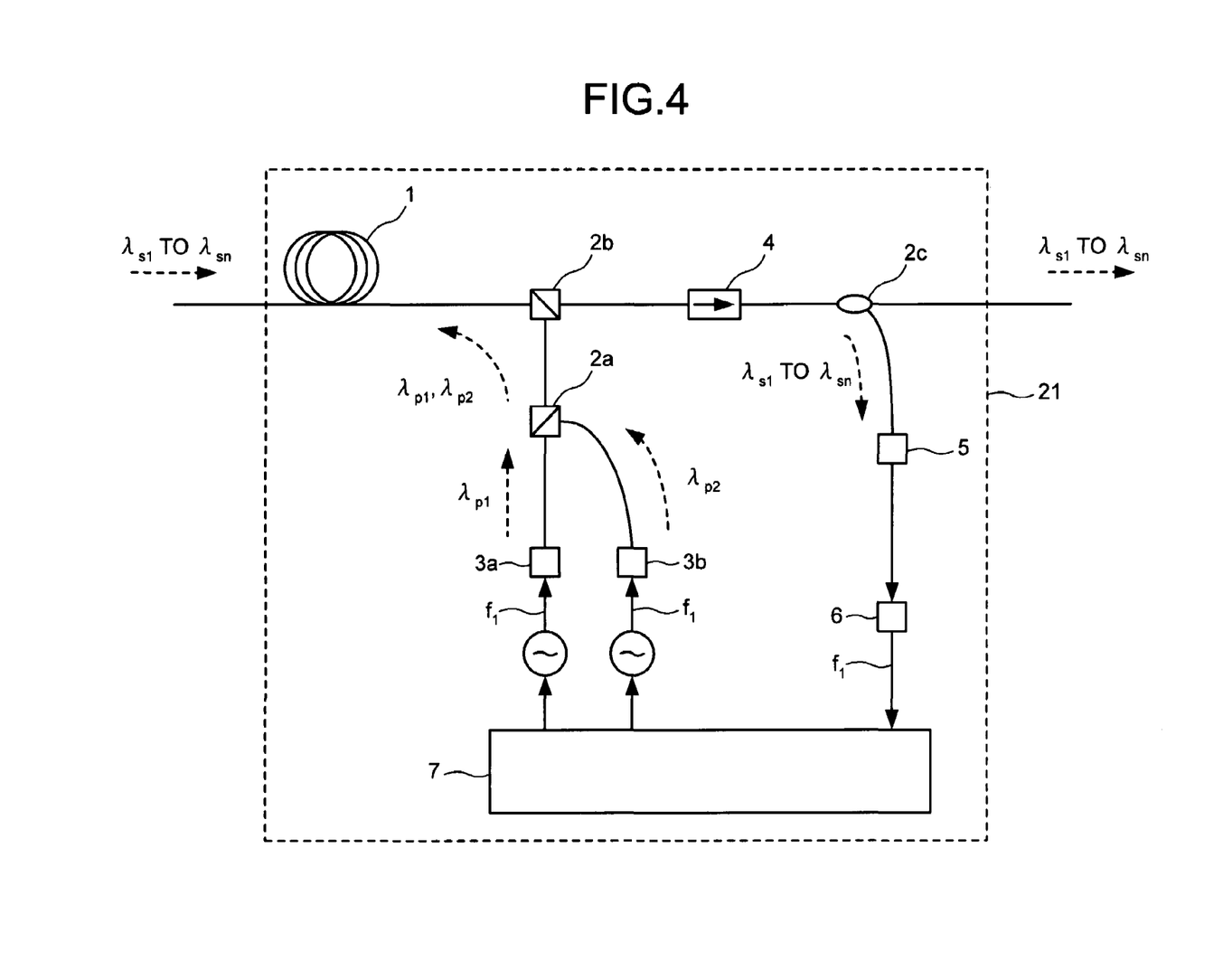
FIG. 4 is a block diagram of a schematic configuration of the optical amplifier according to a first embodiment of the present invention.

FIG. 3 is a schematic diagram of a structure of an optical communication system in which an optical amplifier according to the present invention is used. FIG. 4 is a block diagram of a schematic configuration of an optical amplifier according to the first embodiment of the present invention. The optical communication system includes optical transmission-reception terminal devices 22a and 22b each of which converts electrical signals to optical signals and wavelength-division multiplexes the optical signals in a plurality of wavelength ranges on one another to be transmitted as a WDM main signal light, and reversely, also receives a WDM main signal light and demultiplexes it to optical signals in wavelength ranges to be converted to electrical signals. The optical transmission-reception terminal devices 22a and 22b are connected to each other with a transmission path 1 such as an optical fiber through which the WDM main signal light is transmitted. A predetermined number of optical amplifiers 21a to 21m are serially connected to each other along the transmission path 1 so that the optical transmission-reception terminal device 22b on the reception side receives the WDM main signal light at a predetermined signal level.

An optical amplifier 21 (which could be any one of the optical amplifiers 21a to 21m) includes the optical fiber 1 that is a Raman gain medium through which the WDM main signal light with a plurality of signal lights having wavelengths $\lambda_{s1}$ to $\lambda_{sn}$, wavelength-division multiplexed is transmitted to provide Raman amplification. The optical amplifier 21 also includes a first pump light source 3a that can oscillate a pump light which has a wavelength $\lambda_{p1}$ for amplifying the WDM main signal light propagating through the optical fiber 1, and of which intensity is modulated at a frequency $f_1$. The optical amplifier 21 further includes a second pump light source 3b that can oscillate a pump light which has a wavelength $\lambda_{p2}$ for amplifying the WDM main signal light propagating through the optical fiber 1, and of which intensity is modulated at the frequency $f_1$. The optical amplifier 21 further includes a first photocoupler 2a that couples the pump lights oscillated from the two pump light sources 3a and 3b, and a second photocoupler 2b that guides the pump lights coupled, to the optical fiber 1, and an optical isolator 4 that prevents backflow of the WDM main signal light amplified to allow the operation of amplification to be stable. It is noted that the WDM main signal light is introduced from the left side of the optical fiber 1 of FIG. 3.

As the optical fiber 1, a silica-based glass optical fiber as a single-mode optical fiber (SMF) is exemplified, but it is not limited thereto. For example, a tellurite glass optical fiber or the like may also be used.

As the first and second pump light sources 3a and 3b, a gas laser or a solid-state laser can be used, but it is particularly preferable to use a semiconductor laser capable of controlling the power of a pump light by a drive current. It is assumed herein that a light in a band including wavelengths ranging from 1.53 μm ($=\lambda_{s1}$) to 1.56 μm ($=\lambda sn$) is used as a WDM main signal light, and that a light having a wavelength of 1.44 μm ($=\lambda p1$) and a light having a wavelength of 1.46 μm ($=\lambda p2$) are used as pump lights.

The optical amplifier 21 further includes a third photocoupler 2c that branches a part (e.g., 5%) of the WDM main signal light Raman-amplified on the downstream side of the second photocoupler 2b, and a photodetector 5 that converts the WDM main signal light branched by the third photocoupler 2c to electrical signals. The optical amplifier 21 further includes an electric filter 6 that extracts a frequency component $f_1$ used to modulate the intensity of the pump light, out of the electrical signals converted by the photodetector 5, and separates the frequency component $f_1$ therefrom as a gain modulation signal. The optical amplifier 21 further includes a control electric circuit 7 that controls the intensities of pump lights of the first and the second pump light sources 3a and 3b based on the amplitude of the gain modulation signal separated by the electric filter 6.

The control electric circuit 7 has functions of obtaining drive currents for the first and the second pump light sources 3a and 3b to obtain a predetermined Raman gain, and controlling the first and the second pump light sources 3a and 3b by the drive currents obtained. When the drive current for the first pump light source 3a is to be obtained, the control electric circuit 7 superimposes a modulation signal whose intensity has been modulated at the frequency $f_1$ on the drive current for the first pump light source 3a. As a result, the control electric circuit 7 detects the amplitude of the gain modulation signal from changes in waveforms of the gain modulation signals in the wavelength of a main signal light Raman-amplified obtained in the electric filter 6 within a predetermined period. The intensity (power) of the first pump light source 3a is controlled by a drive current so that the amplitude of the gain modulation signal falls within a range of predetermined values. When a drive current, at which the amplitude of the gain modulation signal may fall within the range of the predetermined values, is obtained, the control electric circuit 7 drives the first pump light source 3a by the drive current. When the control of the drive current for the first pump light source 3a is finished, the control electric circuit 7 stops application of the modulation signal whose intensity has been modulated at the frequency $f_1$ to the drive current for the first pump light source 3a. The control electric circuit 7 also applies the modulation signal whose intensity has been modulated at the frequency $f_1$ to the second pump light source 3b in the same manner as explained above to obtain a drive current at which the amplitude of the gain modulation signal may fall within the range of the predetermined values. The drive currents for the pump light sources 3a and 3b thus obtained are used to drive the first and the second pump light sources 3a and 3b to provide Raman amplification.

The operation of the optical amplifier 21 is explained below. The case of using a semiconductor laser as the first and the second pump light sources 3a and 3b is exemplified in the explanation hereinafter. At first, a modulation signal whose intensity has been modulated at the frequency $f_1$ is superimposed on a drive current for the first pump light source 3a, out of drive currents for driving the first and the second pump light sources 3a and 3b, by the control electric circuit 7. The drive current intensity-modulated is discharged to the first pump light source 3a, a pump light having a wavelength $\lambda_{p1}$ whose intensity has been modulated at the frequency $f_1$ is emitted from the first pump light source 3a, while a pump light having a wavelength $\lambda_{p2}$ whose intensity has not been modulated is emitted from the second pump light source 3b. The pump lights output from the first and the second pump light sources 3a and 3b are coupled to each other by the first photocoupler 2a, and the pump lights coupled are guided to the optical fiber 1 by the second photocoupler 2b. The pump light travels through the optical fiber 1 in a reverse direction to a direction of a WDM main signal light, and Raman-amplifies the WDM main signal light propagating through the optical fiber 1 by a stimulated Raman scattering phenomenon. At this time, the WDM main signal light in the optical fiber 1 is Raman-amplified with gain modulated at the frequency $f_1$ the same as the frequency $f_1$ at which the intensity of the pump light has been modulated.

The WDM main signal light Raman-amplified passes through the second photocoupler 2b and the optical isolator 4 to enter the third photocoupler 2c. Almost all the WDM main signal light passes through the third photocoupler 2c and propagates through the optical fiber 1 as it is toward the optical transmission-reception terminal device 22b on the reception side. However, a part (e.g., 5%) of the WDM main signal light is branched. The WDM main signal light branched enters the photodetector 5.

The WDM main signal light is converted to electrical signals in the photodetector 5, and the electrical signals enter the electric filter 6. The electric filter 6 extracts and separates the electrical signal having the frequency component $f_1$. The electrical signal having the frequency component $f_1$ separated by the electric filter 6, that is, a gain modulation signal enters the control electric circuit 7. The control electric circuit 7 detects an amplitude of the gain modulation signal in the wavelengths of main signal lights from changes in waveforms of the gain modulation signals incident thereto within a predetermined period. The control electric circuit 7 controls a drive current for the first pump light source 3a that modulates the intensity of pump light at the frequency $f_1$, so that the amplitudes of the gain modulation signals become a predetermined value. The power of the pump light output from the first pump light source 3a is controlled by the modulation signal or the drive current controlled.

The power of the pump light output from the first pump light source 3a is controlled, and the first pump light source 3a is controlled, by the control electric circuit 7, to be constant by a drive current with a value controlled. A modulation signal whose intensity has been modulated at the frequency $f_1$ is superimposed on a drive current for the second pump light source 3b. The drive current for the second pump light source 3b is controlled in the same manner as the control of the drive current for the first pump light source 3a so that a predetermined Raman gain is obtained, that is, an amplitude of the gain modulation signal becomes a predetermined value.

The power of the pump light output from the second pump light source 3b is controlled, and the first and the second pump light sources 3a and 3b are controlled, by the control electric circuit 7, to be constant by respective drive currents controlled. As a result, a Raman gain bandwidth can be made to a broader bandwidth so as to cover the wavelengths $\lambda_{s1}$ to $\lambda_{sn}$ of the WDM main signal lights in the same manner as the optical spectrum as shown in FIG. 2. Therefore, the loss of the optical fiber 1 can be compensated for over the broad bandwidth in the transmission bandwidth of the WDM main signal light.

Although the example of providing the optical isolator 4 in the optical fiber 1 has been explained, the optical isolator 4 may be omitted depending on operating conditions.

The operation of the optical communication system that includes the optical amplifier 21 is explained below. As shown in FIG. 3, the WDM main signal light propagates from the optical transmission-reception terminal device 22a toward the optical transmission-reception terminal device 22b. The first optical amplifier 21a, the second optical amplifier 21b, . . . , the m-th optical amplifier (where m is any natural number) 21m are arranged in order from the side (upstream side of the WDM main signal light) of the optical transmission-reception terminal device 22a.

For controlling Raman gain of the optical communication system, the first optical amplifier 21a, arranged on the side of the transmission-reception terminal device 22a that is the transmission side, controls the drive current for the pump light source in the first optical amplifier 21a so that an amplitude of a gain modulation signal of the WDM main signal light Raman-amplified becomes a predetermined value using the method. When the control of all the drive currents for the pump light sources in the first optical amplifier 21a is complete, an instruction to perform control over the drive current for the pump light source is transmitted to the second optical amplifier 21b by using a signal indicating monitor and control of the optical communication system. When receiving the instruction, the second optical amplifier 21b controls the drive currents for the pump light sources using the method.

The optical amplifier 21 arranged in the optical communication system controls the drive currents for the pump light sources in order from the pump light source arranged on the upstream side of the WDM main signal light in the above manner. When the drive currents are controlled in all of the optical amplifier 21, the WDM main signal light transmitted from the optical transmission-reception terminal device 22a and propagating through the optical fiber 1 is Raman-amplified with the predetermined drive currents controlled, and then the WDM main signal light Raman-amplified reaches the optical transmission-reception terminal device 22b.

As shown in FIG. 4, the two pump light sources 3a and 3b are provided in the optical amplifier 21, but the number of the pump light source is not limited to two. Any number of pump light sources can be provided. Even if more than two pump light sources are provided, the intensity of a pump light can be controlled in each pump light source to obtain a predetermined Raman amplification gain. A control procedure of the intensities of pump lights having the number 2s of pump wavelengths may be performed by setting the intensities of the pump lights in order of the shortest wavelength, the longest wavelength, the second shortest wavelength, the second longest wavelength, . . . , the s-th shortest wavelength, and the s-th longest wavelength. Furthermore, the control procedure may be repeated until the levels of the signal lights fall within a predetermined range. A pump wavelength on the outer side has a smaller number of signal wavelengths that contribute to Raman gain, and therefore, the high intensity of pump light is required. Moreover, the intensity of a shorter pump wavelength decreases more during Raman transition between pump lights, and therefore, the high intensity of pump light is required. Consequently, it is possible to complete the control efficiently by the procedure in which the intensities of the pump lights are controlled in order from a pump light having higher intensity, i.e., in order from a pump light that more largely contributes to Raman gain.

According to the first embodiment, the intensities of drive currents for a pump light source 3 (which may be any one of the pump light sources 3a and 3b) in the optical amplifier 21 are modulated at the predetermined frequency, and the intensity of a pump light output from the pump light source 3 is modulated to intensity-modulate Raman gain. A gain modulation signal superimposed on a main signal light Raman-amplified is separated and detected, and the power of the pump lights is controlled so that an amplitude of the gain modulation signal detected becomes a predetermined value to thereby control Raman gain. This operation is performed by using intensity modulation signals having the same frequencies at time intervals in each of the pump light source 3 that outputs pump lights having different wavelengths. Therefore, it is possible to make broader the bandwidth of the Raman gain so as to cover a transmission bandwidth of a required WDM main signal light, and to make uniform the level of the WDM main signal light Raman-amplified. The intensities of the pump lights output from the pump light sources 3a and 3b are controlled so that the amplitudes of the gain modulation signals fall within a predetermined range, which allows control of the main signal lights to be facilitated.

The drive currents for the pump light source 3 are controlled in order from any of the optical amplifier 21 one by one provided on the upstream side of the WDM main signal light that propagates through the optical fiber 1, which allows long-distance transmission of the WDM main signal light in which the levels of the signal lights are made uniform over a broad bandwidth.

SECOND EMBODIMENTI

In the first embodiment, the frequency $f_1$ of the intensity modulation signals applied to the drive currents for the pump light source 3 in the optical amplifier 21 is the same for each of the pump light sources 3. Therefore, the drive currents for the pump light source 3 are controlled at time intervals to provide Raman amplification. The second embodiment of the present invention explained below relates to an optical amplifier 221 capable of simultaneously controlling drive currents for the pump light source 3.

Figure 5:
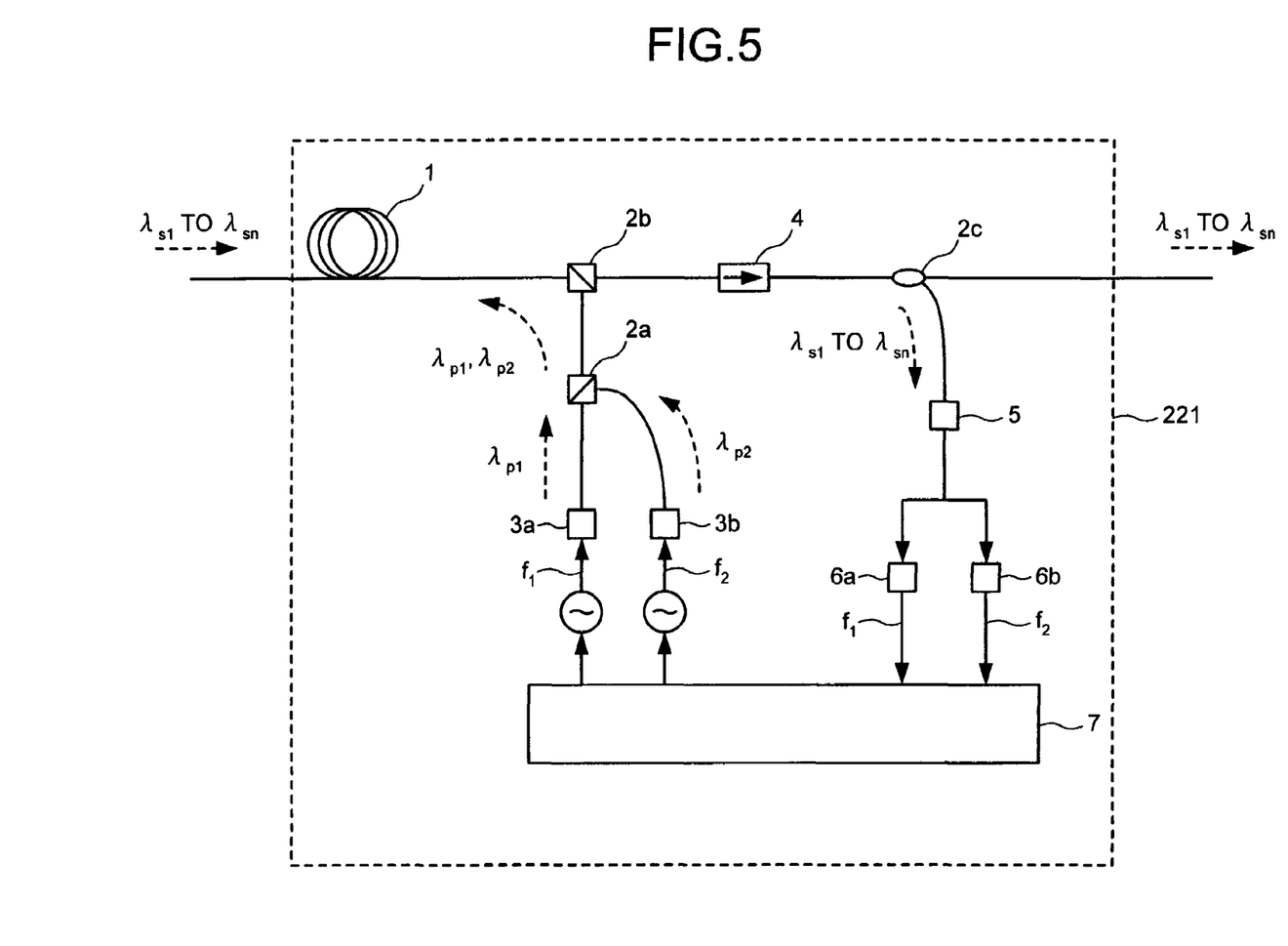
FIG. 5 is a block diagram of a schematic configuration of the optical amplifier according to a second embodiment of the present invention.

FIG. 5 is a block diagram of a schematic configuration of the optical amplifier 221 according to the second embodiment of the present invention. The optical amplifier 221 is configured, based on the configuration as shown in FIG. 4 with reference to the first embodiment, such that the control electric circuit 7 applies modulation signals whose intensities have been modulated at frequencies $f_1$ and $f_2$ respectively to the drive currents for the first and the second pump light sources 3a and 3b. The electric filter 6 is divided into two units, a first electric filter 6a and a second electric filter 6b, so that the two units concurrently extract and separate gain modulation signals having the components of the frequencies f1 and f2 from electrical signals of the WDM main signal light having Raman amplification gain intensity-modulated. It is noted that components that are the same as those in FIG. 4 with reference to the first embodiment are assigned with the same reference signs, and explanation thereof is omitted. The case of using a semiconductor laser as the first and the second pump light sources 3a and 3b is explained below.

The first electric filter 6a extracts a gain modulation signal having a component of the frequency $f_1$ from electrical signals output from the photodetector 5, and outputs the gain modulation signal to the control electric circuit 7. The second electric filter 6b extracts a gain modulation signal having a component of the frequency $f_2$ from the electrical signals output from the photodetector 5, and outputs the gain modulation signal to the control electric circuit 7.

The control electric circuit 7 applies the modulation signal whose intensity has been modulated at the frequency $f_1$ to the drive current for the first pump light source 3a, and at the same time, applies the modulation signal whose intensity has been modulated at the frequency $f_2$ to the drive current for the second pump light source 3b. The control electric circuit 7 detects amplitudes of gain modulation signals in wavelengths of main signal lights using changes in waveforms of the gain modulation signals input thereto within a predetermined period from the first and the second electric filters 6a and 6b at each frequency. Thereafter, the control electric circuit 7 controls the intensity (power) of the first and the second pump light sources 3a and 3b corresponding to respective frequencies by drive currents so that the amplitudes of the gain modulation signals fall within a range of predetermined values. When drive currents by which the amplitudes of gain modulation signals fall within the range of the predetermined values are obtained, the control electric circuit 7 drives the first and the second pump light sources 3a and 3b by the drive currents obtained. At the same time, the control electric circuit 7 stops applying the modulation signals whose intensities have been modulated at the respective frequencies $f_1$ and $f_2$ to the drive currents for the first and the second pump light sources 3a and 3b.

The operation of the optical amplifier 221 is explained below. The control electric circuit 7 concurrently superimposes modulation signals whose intensities have been modulated at the frequencies $f_1$ and $f_2$ on drive currents for driving the first and the second pump light sources 3a and 3b, respectively. The respective drive currents superimposed are discharged to the first and the second pump light sources 3a and 3b to thereby output pump lights having wavelengths $\lambda_{p1}$ and $\lambda_{p2}$ whose intensities have been modulated at the frequencies $f_1$ and $f_2$, each of which has a predetermined modulation factor, from the first and the second pump light sources 3a and 3b, respectively. The respective pump lights output from the first and the second pump light sources 3a and 3b are coupled by the first photocoupler 2a, and the pump lights coupled are guided to the optical fiber 1 by the second photocoupler 2b. The pump light travels through the optical fiber 1 in the reverse direction to the direction of a WDM main signal light, and Raman-amplifies the WDM main signal light, which is introduced from the side of the optical transmission-reception terminal device 22a, in the optical fiber 1 using the stimulated Raman scattering phenomenon. At this time, the WDM main signal light inside the optical fiber 1 is Raman-amplified with gain modulated at the frequencies $f_1$ and $f_2$ at which the intensities of the two pump lights have been modulated.

The WDM main signal light Raman-amplified passes through the second photocoupler 2b and the optical isolator 4 to enter the third photocoupler 2c. Almost all the WDM main signal light passes through the third photocoupler 2c and propagates as it is through the optical fiber 1 toward the optical transmission-reception terminal device 22b on the reception side. However, a part (e.g., 5%) of the WDM main signal light is branched, and the WDM main signal light branched enters the photodetector 5.

The WDM main signal light is converted to electrical signals in the photodetector 5, and the electrical signals enter the first and the second electric filters 6a and 6b. The first electric filter 6a extracts and separates a gain modulation signal having a component of the frequency $f_1$, while the second electric filter 6b extracts and separates a gain modulation signal having a component of the frequency $f_2$. The gain modulation signals, having the components of the frequencies $f_1$ and $f_2$ separated by the first and the second electric filters 6a and 6b respectively, enter the control electric circuit 7.

The control electric circuit 7 detects amplitudes of the gain modulation signals in the wavelengths of main signal lights from changes in waveforms of the gain modulation signals incident thereto within a predetermined period. The control electric circuit 7 controls the intensities of the drive currents for the first and the second pump light sources 3a and 3b that modulate the intensities of pump lights at the frequencies so that the amplitudes of the gain modulation signals become a predetermined value. The power of the pump lights output from the first and the second pump light sources 3a and 3b is controlled by the drive currents controlled, to a value with which a predetermined Raman gain can be obtained.

Although an example in which the optical isolator 4 has been provided in the optical fiber 1 has been explained, the optical isolator 4 may be not be necessary depending on operating conditions.

In the optical communication system including the optical amplifier having the configuration, as explained in the first embodiment, Raman amplification gains are sequentially controlled one by one at time intervals in order from the optical amplifier 21a arranged on the side of the optical transmission-reception terminal device 22a that transmits the WDM main signal light toward the downstream side to which the WDM main signal light flows.

As shown in FIG. 5, the two pump light sources 3a and 3b are provided in the optical amplifier 21, but the number is not limited to two, and therefore, any number of pump light sources may be provided. In this case, the intensities of all the pump light sources are modulated with modulation signals having different frequencies, and at the same time, the intensities of pump lights are controlled to obtain a predetermined Raman gain.

According to the second embodiment, by performing intensity modulation on pump lights having different wavelengths at different frequencies, the Raman amplification gain is intensity-modulated, and the gain modulation signals having the different frequencies superimposed on one another are separated from the WDM main signal light Raman-amplified and detected. The power of the pump lights whose intensities have been modulated at the frequencies is controlled so that the amplitudes of the gain modulation signals having the frequencies detected become a predetermined value, and Raman amplification gain is thereby controlled. Thus, the drive currents for the pump light source 3 of the optical amplifier 21 can be controlled within a short time.

In the first and the second embodiments, the example of so-called backward pumping, such that the direction of travel of the pump light and the direction of travel of the WDM main signal light are reverse to each other, has been explained, but the pumping direction is not limited thereto. For example, forward pumping such that the direction of travel of the pump light and the direction of travel of the WDM main signal light are the same as each other may be used. Alternatively, bidirectional pumping such that the pump light may be made to travel in the same direction as or the reverse direction to the direction of travel of the WDM main signal light may be used.

In the first and the second embodiments, the optical amplifiers 21 and 221 of a distributed constant type, presuming that the optical fiber 1 serving as a Raman amplifying medium is a transmission path of a signal light, have been explained. However, the present invention can be used in an optical amplifier of a concentrated constant type that provides Raman amplification using an optical fiber as a Raman gain medium included in the optical amplifiers 21 and 221. Furthermore, not only the optical fiber but also an optical waveguide such as a silica-based glass planar lightwave circuit can be used as the Raman gain medium. The optical waveguide may have a photonic crystal structure.

THIRD EMBODIMENT

If a channel for a part of the WDM main signal light is not used or if transmission of a part of the WDM main signal light is interrupted at the time of initially introducing the optical communication system or the optical amplifiers 21 and 221 according to the first and the second embodiments, there comes up a problem as to how to control the power of a pump light that contributes to Raman amplification of a wavelength range of the main signal light that is missing.

Therefore, if there is a wavelength range in which a predetermined amplitude of gain modulated is not obtained caused by missing of a part of the main signal light, the pump light source 3 is controlled so that a pump light that mainly contributes to Raman amplification of the wavelength range becomes predetermined initialized power. It is thereby possible to maintain the operation as the optical amplifiers 21 and 221.

According to the third embodiment, when a main signal light as a part of the WDM main signal light is missing, a pump light corresponding to a wavelength range of the missing main signal light is controlled to the predetermined initialized power, which allows the operation as the optical amplifiers 21 and 221 to be maintained.

FOURTH EMBODIMENT

Figure 6:
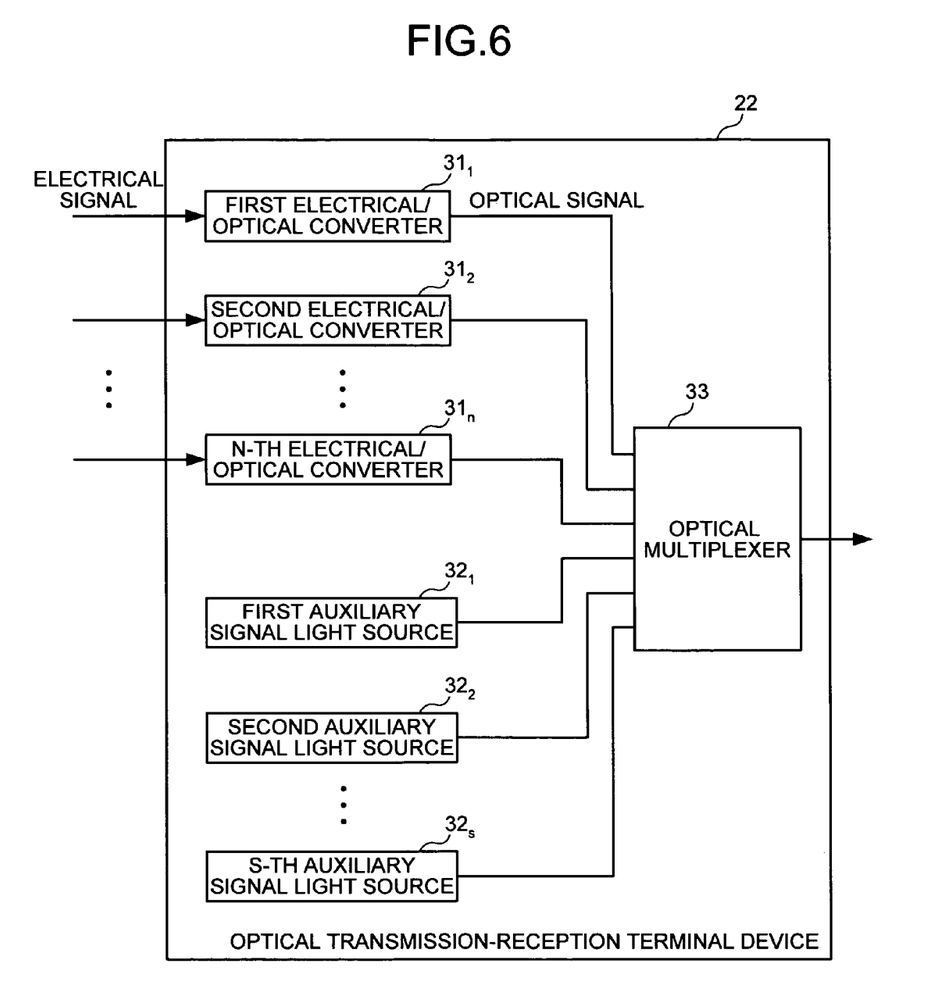
FIG. 6 is a block diagram of a schematic configuration of an optical transmission-reception terminal device.

FIG. 6 is a block diagram of a schematic configuration of an optical transmission-reception terminal device. An optical transmission-reception terminal device 22 (which may be any one of the optical transmission-reception terminal devices 22a and 22b) includes first to n-th electrical/optical converters (where n is any natural number, which is the number of wavelength ranges of main signal lights wavelength-multiplexed) $31_1$ to $31_n$. The optical transmission-reception terminal device 22 also includes a first to an s-th auxiliary signal light sources (where s is any natural number) $32_1$ to $32_s$ that output auxiliary signal lights in wavelength ranges deviating from wavelength ranges of individual main signal lights that form the WDM main signal light. The optical transmission-reception terminal device 22 further includes an optical multiplexer 33 that wavelength-division multiplexes the main signal lights output from the first to the n-th electrical/optical converters $31_1$ to $31_n$ and the auxiliary signal lights output from the first to the s-th auxiliary signal light sources $32_1$ to $32_s$.

The first to the n-th electrical/optical converters $31_1$ to $31_n$ each include a transmission coding unit that performs transmission coding on a digital signal from a signal source, a semiconductor laser that outputs signal light, a drive circuit that drives the semiconductor laser, and an output level controller that controls a drive current by the drive circuit to keep the output of the semiconductor laser to a predetermined value, although these components are not shown. Based on the configuration, the digital signal is converted to an optical signal. If the output of a laser beam is to be modulated by an optical intensity modulator, the output level controller controls the optical intensity modulator to keep the output level of the laser beam to a predetermined value.

The first to the s-th auxiliary signal light sources $32_1$ to $32_s$ output auxiliary signal lights being in wavelength ranges provided with Raman amplification by pump lights from the optical amplifiers 21a to 21m included in the optical communication system, and being in wavelength ranges deviating from wavelength ranges of individual main signal lights that form the WDM main signal light. The auxiliary signal light source is formed with, for example, the semiconductor laser. The number of auxiliary signal light sources $32_1$ to $32_s$ is equal to the number of wavelengths of different pump lights used in the optical communication system.

The optical multiplexer 33 multiplexes the signal lights output from the first to the n-th electrical/optical converters $31_1$ to $31_n$ and the auxiliary signal lights output from the first to the s-th auxiliary signal light sources $32_1$ to $32_s$ to output the signal lights multiplexed as the WDM main signal light to the optical fiber 1.

On the other hand, in the first or the second embodiment, the optical amplifiers 21 and 221 detects amplitudes of gain modulation signals in the individual auxiliary signal lights of the WDM main signal light transmitted from the optical transmission-reception terminal device 22a, and performs gain control based on the amplitudes.

By providing such a configuration as explained above, even if the WDM main signal light lacks a wavelength range of a main signal light, an auxiliary signal light corresponding to a pump light that contributes to Raman amplification is included therein, and therefore, the configuration allows control for the power of the pump light contributing to Raman amplification of the wavelength range of the missing main signal light.

According to the fourth embodiment, the optical transmission-reception terminal devices 22a and 22b are configured so that light in a signal light wavelength range mainly provided with Raman amplification by pump lights used in the optical amplifiers 21 and 221 is determined as an auxiliary signal light to be wavelength-division multiplexed on the WDM main signal light. Therefore, even if a main signal light as a part of the WDM main signal light is missing, it is possible to control the power of the pump light contributing to Raman amplification of the wavelength range of the missing main signal light.

FIFTH EMBODIMENT

Figure 7:
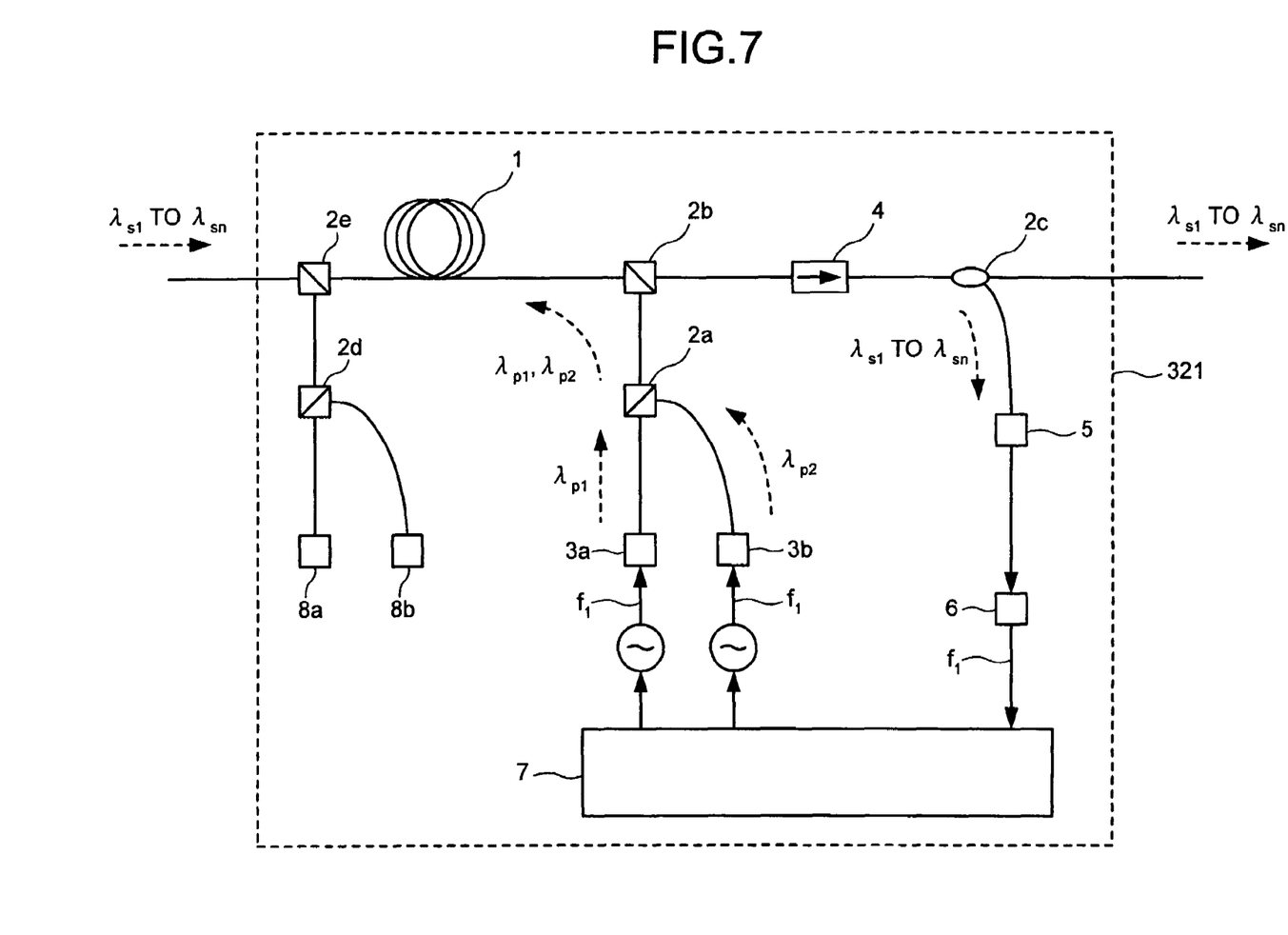
FIG. 7 is a block diagram of a schematic configuration of the optical amplifier according to a fifth embodiment of the present invention.

In the fourth embodiment, the auxiliary signal light sources $32_1$ to $32_s$ are included in the optical transmission-reception terminal devices 22a and 22b, but the auxiliary signal light sources may not be included in the optical transmission-reception terminal devices 22a and 22b but may be included in respective ones of the optical amplifier 21 as shown in FIG. 3. FIG. 7 is a block diagram of a schematic configuration of an optical amplifier according to a fifth embodiment of the present invention. An optical amplifier 321 includes the components as shown in FIG. 4, and further includes auxiliary signal light sources 8a and 8b that correspond to the number of the pump light sources 3a and 3b that output pump lights having different wavelengths, a fourth photocoupler 2d that couples a plurality of auxiliary signal lights output from the auxiliary signal light sources 8a and 8b, and a fifth photocoupler 2e that wavelength-division multiplexes the auxiliary signal lights coupled on the WDM main signal light.

The auxiliary signal light sources 8a and 8b output auxiliary signal lights having wavelengths that are in wavelength ranges mainly provided with Raman amplification gain by pump lights output from the pump light sources 3a and 3b of the optical amplifier 321, and that are not superimposed on the wavelengths of individual main signal lights that form the WDM main signal light. The auxiliary signal light source is formed with, for example, the semiconductor laser.

Because of such a configuration, even if the WDM main signal light lacks a wavelength range of a main signal light, an auxiliary signal light corresponding to a pump light that contributes to Raman amplification is included therein, and therefore, the configuration allows control for the power of the pump light contributing to Raman amplification of the wavelength range of the missing main signal light.

The optical amplifier 221 configured as shown in FIG. 5 with reference to the second embodiment may include the auxiliary signal light sources 8a and 8b that output auxiliary signal lights, the fourth photocoupler 2d that couples a plurality of auxiliary signal lights output from the auxiliary signal light sources 8a and 8b, and the fifth photocoupler 2e that couples the auxiliary signal lights coupled, to the WDM main signal light.

According to the fifth embodiment, the optical amplifier 321 is configured so that light in a signal light wavelength range mainly provided with Raman amplification by pump lights used in the optical amplifier 321 is determined as an auxiliary signal light to be wavelength-division multiplexed on the WDM main signal light. Therefore, even if a main signal light as a part of the WDM main signal light is missing, it is possible to control the power of the pump light contributing to Raman amplification of the wavelength range of the missing main signal light.

Each of the optical communication systems according to the first to the fifth embodiments may include a gain modulator including the control electric circuit 7 that has a function of applying the modulation signal to the drive current for the pump light source 3 to modulate Raman amplification gain of the WDM main signal light, during a period when all the optical amplifiers 21a to 21m included in the optical communication system do not perform gain control. The optical communication system may also include a gain modulation signal detector that has functions of separating a gain modulation signal superimposed on the WDM main signal light Raman-amplified and detecting the gain modulation signal separated. The gain modulation signal detector includes the photodetector 5, the electric filter 6, and the control electric circuit 7. The gain modulator and the gain modulation signal detector may be used as a monitor-control unit used to monitor the optical communication system and transmit/receive control signals. By thus doing, the gain modulator and the gain modulation signal detector used to control Raman amplification gain of the optical amplifiers 21, 221 and 321 and a part of the components of the monitor-control unit used to monitor and control the optical communication system can be shared, which is advantageous in that the structure of the optical communication system can be simplified.

As explained above, according to the present invention, the drive currents for the pump light sources in the optical amplifier are intensity-modulated at a predetermined frequency, and the pump lights output from the pump light sources are intensity-modulated to intensity-modulate Raman amplification gain. The gain modulation signal superimposed on the main signal light Raman-amplified is separated therefrom to detect the gain modulation signal, and the power of the pump light is controlled so that the amplitude of the gain modulation signal detected becomes a predetermined value to thereby control Raman amplification gain. The above processes are performed for each of the pump light sources that output pump lights having different wavelengths using the intensity modulation signal. Therefore, the Raman amplification gain can be made to a broader bandwidth so as to cover a transmission bandwidth of a desired WDM main signal light and uniform the level of the WDM main signal light Raman-amplified. The intensities of the pump lights output from the pump light sources are controlled so that the amplitudes of the gain modulation signals fall within a predetermined range, which allows control of the main signal lights to be facilitated. Furthermore, the intensities of pump lights from the pump light sources are sequentially controlled one by one from an optical amplifier provided on the upstream side of the WDM main signal light that propagates through the optical fiber, which makes it possible to perform long-distance transmission of the WDM main signal light in which the levels of the main signal lights are made uniform over a broad bandwidth.

INDUSTRIAL APPLICABILITY

The present invention is suitable for an optical repeater used in a wavelength division multiplexing communication system and a dense wavelength division multiplexing communication system using optical fiber.

The invention claimed is:

1. An optical amplifier that multiplexes pump lights having different wavelengths output from a plurality of pump light sources on a wavelength-division multiplexed signal light propagating through a transmission path to provide Raman amplification, comprising:
    an intensity modulator configured to modulate intensity of a pump light to be output from any one of the pump light sources, at a predetermined frequency;
    a photoelectric converter configured to convert a part of the wavelength-division multiplexed signal light Raman-amplified by the pump light to electrical signals;
    a gain modulation signal detector configured to extract a gain modulation signal having a component of the frequency from the electrical signals; and
    a controller configured to control only the intensity of pump lights that are output from the pump light source, of which intensity is modulated at the frequency to control Raman amplification gain so that an amplitude of the gain modulation signal becomes a predetermined value, wherein the intensities of pump lights output from individual pump light sources are sequentially controlled to obtain a predetermined value of the Raman amplification gain.

2. The optical amplifier according to claim 1, wherein if a main signal light as a part of the wavelength-division multiplexed signal light is missing, the controller controls a pump light source that outputs a pump light so as to keep the pump light to initially set output, the pump light mainly contributing to Raman amplification of the main signal light that is missing.

3. The optical amplifier according to claim 1, wherein an auxiliary signal light is further wavelength-division multiplexed on the wavelength-division multiplexed signal light, the auxiliary signal light being in a wavelength range in which high Raman amplification is provided by the pump light output from the pump light sources and being in a wavelength range deviating from a wavelength range of the main signal light that forms the wavelength-division multiplexed signal light, and the controller controls the intensity of the pump light that mainly contributes to Raman amplification of the auxiliary signal light so that an amplitude of the gain modulation signal in the auxiliary signal light becomes a predetermined value.

4. The optical amplifier according to claim 1, further comprising:

an auxiliary signal light source that outputs an auxiliary signal light being in a wavelength range in which high Raman amplification is provided by the pump light output from the pump light sources and being in a wavelength range different from a wavelength range of a main signal light that forms the wavelength-division multiplexed signal light; and an optical multiplexer that wavelength-division multiplexes the auxiliary signal light on the wavelength-division multiplexed signal light, wherein the controller controls the intensity of the pump light that mainly contributes to Raman amplification of the auxiliary signal light so that an amplitude of the gain modulation signal in the auxiliary signal light becomes a predetermined value.

5. An optical communication system comprising:

an optical transmitter configured to convert electrical signals to optical signals to obtain a wavelength-division multiplexed signal light, and transmits the wavelength-division multiplexed signal light through a transmission path;

an optical receiver configured to convert the wavelength-division multiplexed signal light received through the transmission path to the electrical signal; and a plurality of optical amplifiers that are cascade-connected between the optical transmitter and the optical receiver, wherein each of the optical amplifiers multiplexes pump lights, having different wavelengths output from a plurality of pump light sources, on the wavelength-division multiplexed signal light transmitting through the transmission path to provide Raman amplification, and compensates for transmission loss of the wavelength-division multiplexed signal light by the Raman amplification, wherein each of the optical amplifiers includes an intensity modulator configured to modulate intensity of a pump light to be output from any one of the pump light sources, at a predetermined frequency;

a photoelectric converter configured to convert a part of the wavelength-division multiplexed signal light Raman-amplified by the pump light to electrical signals;

a gain modulation signal detector configured to extract a gain modulation signal having a component of the frequency from the electrical signals; and a controller configured to control only the intensity of pump lights that are output from the pump light source, of which intensity is modulated at the frequency to control Raman amplification gain so that an amplitude of the gain modulation signal becomes a predetermined value, wherein intensities of the pump lights output from the pump light sources of each of the optical amplifiers are sequentially controlled at time intervals in order from an optical amplifier arranged on the side of the optical transmitter to obtain a predetermined Raman amplification gain, and in the optical amplifier, intensities of the pump lights output from the individual pump light sources are sequentially controlled at time intervals to obtain the predetermined Raman amplification gain.

6. The optical communication system according to claim 5, wherein if a main signal light as a part of the wavelength-division multiplexed signal light that is transmitted from the optical transmitter is missing, the controller of each of the optical amplifiers controls a pump light source that outputs a pump light so as to keep the pump light to initially set output, the pump light mainly contributing to Raman amplification of the main signal light that is missing.

7. The optical communication system according to claim 5, wherein the optical transmitter includes an auxiliary signal light sources each of which outputs an auxiliary signal light being in a wavelength range in which high Raman amplification is provided by the pump light output from the pump light source and being in a wavelength range deviating from a wavelength range of a main signal light that forms the wavelength-division multiplexed signal light; and an optical multiplexer that wavelength-division multiplexes the wavelength-division multiplexed signal light and the auxiliary signal light to obtain a wavelength-division multiplexed signal light, wherein the controller of each of the optical amplifier controls the intensity of the pump light that mainly contributes to Raman amplification of the auxiliary signal light so that an amplitude of the gain modulation signal in the auxiliary signal light becomes a predetermined value.

8. The optical communication system according to claim 5, wherein each of the optical amplifiers includes an auxiliary signal light source that outputs an auxiliary signal light being in a wavelength range in which high Raman amplification is provided by the pump light output from the pump light sources and being in a wavelength range different from a wavelength range of a main signal light that forms the wavelength-division multiplexed signal light; and an optical multiplexer that wavelength-division multiplexes the auxiliary signal light on the wavelength-division multiplexed signal light, wherein the controller controls the intensity of the pump light that mainly contributes to Raman amplification of the auxiliary signal light so that an amplitude of the gain modulation signal in the auxiliary signal light becomes a predetermined value.

9. The optical communication system according to claim 5, wherein if the control for the intensity of the pump light output from the pump light source to obtain a predetermined Raman amplification gain is failed in the optical amplifier, the intensity modulator of the optical amplifier is used to transmit monitor-and-control signals in the optical communication system, and the gain modulation signal detector and the controller of each of the optical amplifiers are used to receive and control the monitor-and-control signals.

\* \* \* \* \*